Nov. 19, 1963  D. M. LAZAR  3,111,249

SPROCKET FOR MOTION PICTURE APPARATUS

Filed Feb. 24, 1961  2 Sheets-Sheet 1

INVENTOR
David M. Lazar

BY Stevens, Davis, Miller & Mosher
ATTORNEYS

Nov. 19, 1963 — D. M. LAZAR — 3,111,249
SPROCKET FOR MOTION PICTURE APPARATUS
Filed Feb. 24, 1961 — 2 Sheets-Sheet 2
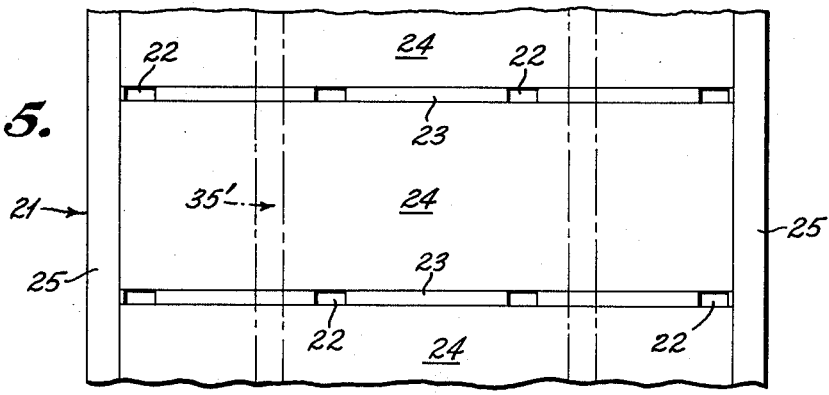
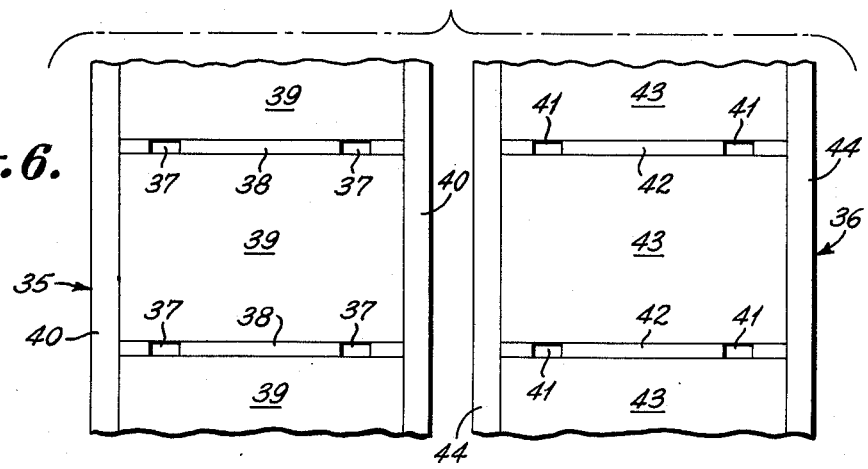
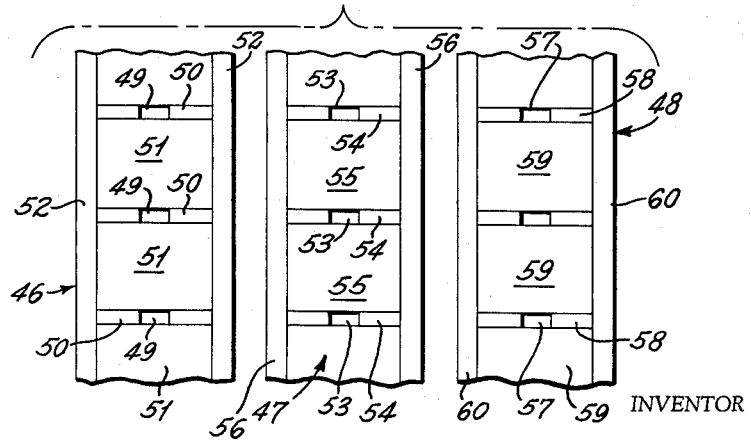
INVENTOR
David M. Lazar
BY Stevens, Davis, Miller & Mosher
ATTORNEYS

United States Patent Office 3,111,249
Patented Nov. 19, 1963

3,111,249
SPROCKET FOR MOTION PICTURE APPARATUS
David M. Lazar, 521 Farrington Road, Rockville Centre, N.Y.
Filed Feb. 24, 1961, Ser. No. 91,473
6 Claims. (Cl. 226—85)

The present invention relates to motion picture apparatus and, in particular, to a novel sprocket for use in connection with the same. This application is a continuation-in-part of my copending application Serial No. 449,687 filed August 13, 1954.

In the art of motion pictures, many schemes have been advanced in recent years in an effort to obtain three-dimensional motion pictures, or at least to create the effect of three-dimensional motion pictures in the mind of the viewer. Other schemes have also been advanced in an effort to create other and different effects. The above schemes have involved various and different photographing and projecting techniques as well as the employment of various and different sizes and arrangements of film. Generally speaking, each new size or arrangement of film has involved a sprocket of new and different design.

It is a principal object of the present invention to provide a sprocket for motion picture apparatus of the type referred to above which will be capable of adapting itself to a multitude of various and different uses.

It is a further object of the present invention to provide pad rollers which have been suitably designed in conjunction with the sprocket and which are adapted to engage the film along its marginal edges.

Other and further objects and advantageous features of the present invention will hereinafter more fully appear in conjunction with a detailed description of the drawings in which FIGURE 1 is a longitudinal elevation of the sprocket embodying my invention;

FIGURE 5 shows a 70 mm. film designed for use in conjunction with the sprocket shown in FIGURE 1;

FIGURE 6 shows two 35 mm. films designed for use in conjunction with the sprocket shown in FIGURE 1; and FIGURE 7 shows three 16 mm. films designed for use in conjunction with the sprocket shown in FIGURE 1.

Figure 1:
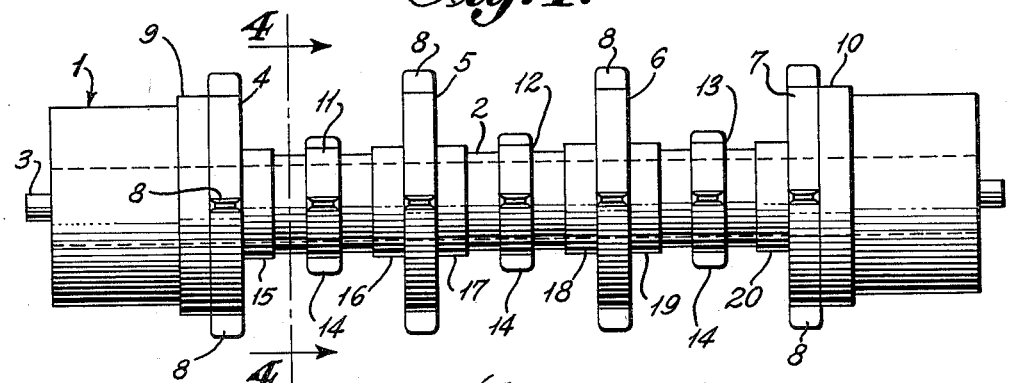
Figure 4:
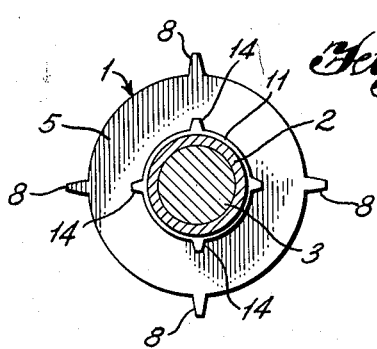
FIGURE 4 is a transverse cross-sectional view taken along section line 4—4 of FIGURE 1, showing further details of the sprocket.

Referring to the drawings in detail, FIGURES 1 and 4 show a sprocket 1 having a main shank portion 2 mounted on a shaft 3 which passes through the shank portion 2. The shaft 3 is preferably driven at 1440 r.p.m. (24 exposures per second) at a 90° intermittent movement. The sprocket is provided with four raised portions, or radial flanges, of maximum diameter 4, 5, 6 and 7 which are symmetrically spaced with respect to the sprocket and which are equally spaced from one another. Each one of these raised portions is provided with four equally and circumferentially spaced sprocket teeth, all of which are generally designated by the reference numeral 8. The endmost flanges 4 and 7 are provided with laterally extending portions 9 and 10, respectively, which are flat cylindrical surfaces having diameters corresponding to the root portions of the sprocket teeth 8.

Equally spaced between the raised portions 4, 5, 6 and 7 and equally spaced from each other are intermediate raised portions or radial flanges 11, 12 and 13. Each of these intermediate raised portions is provided with four equally spaced sprocket teeth, all of the latter being generally designated by the reference numeral 14.

In the space between flanges 4 and 5, the smaller flange 11 is complemented by cylindrical surfaces 15 and 16 adjacent to the flanges 4 and 5, respectively. The diameters of these cylindrical portions are equal to the root diameter of the teeth 14 and provide resting surfaces for the films to be carried by the sprocket teeth 14. The smaller flanges 12 and 13 are similarly provided with cylindrical surfaces 17 and 18 and cylindrical surfaces 19 and 20, respectively, which are otherwise similar to cylindrical surfaces 15 and 16.

The larger flanges 4, 5, 6 and 7 are adapted for use in conjunction with 70 mm. and 35 mm. films such that the sprocket teeth 8 engage suitable perforations in the film. For example, as shown in FIGURE 5, a 70 mm. film 21 is provided with a plurality of perforations or holes 22 located along the frame lines 23 between adjacent picture areas 24. The film 21 is also provided with marginal edges 25 containing the various soundtracks which may be desired under the circumstances. The advantage of the arrangement shown in FIGURE 5 is that, when the sprocket holes or perforations are located along the frame lines, the marginal edges 25 on both sides of the film are available for use as soundtracks. For example, it is possible to put magnetic and optical soundtracks on either or both marginal edges of the film 21 so as to produce stereophonic and other effects. The marginal edges 25 are sufficiently wide that a plurality of soundtracks can be placed side by side along the margin. Also, when using a magnetic soundtrack of the transparent type, it is possible to superimpose an optical soundtrack.

Figure 3:
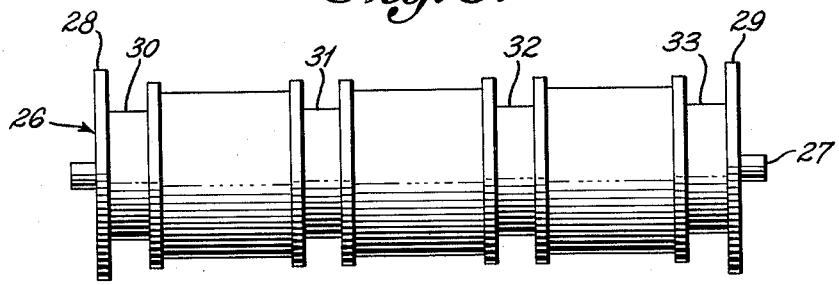
FIGURE 3 is a longitudinal elevation of another embodiment of a pad roller designed for use in combination with the sprocket shown in FIGURE 1.

FIGURE 3 shows a pad roller 26 which is adapted to be used in combination with the sprocket of FIGURE 1 when the latter is employing film of the type shown in FIGURE 5. Pad roller 26 is mounted for rotation on shaft 27. Adjacent its opposite ends, the pad roller 26 is provided with peripheral ridges 28 and 29 which are adapted to bear against the margins 25 of the film 21 so as to urge the same against the cylindrical portions 9 and 10 of the sprocket 1. The pad roller 26 is also provided with grooves 30, 31, 32 and 33 which serve to provide clearance for the sprocket teeth 8 when the pad roller 26 is operating against the sprocket 1.

FIGURE 6 represents two films, 35 and 36 of 35 mm. size. Film 35 is provided with sprocket holes 37 on frame lines 38 separating the picture areas 39. Film 35 is also provided with marginal edges 40 serving as soundtracks in the same manner as described above in connection with film 21 of FIGURE 5. Film 36 is similarly provided with sprocket holes 41 along frame lines 42 separating the picture areas 43. Film 36 is also provided with marginal edges 44. The above portions of film 36 correspond with the similar portions of film 35 as to size, location and function. With the arrangement shown in FIGURE 6, the films 35 and 36 can be placed in side-by-side relation over the sprocket 1 in FIGURE 1 such that the film 35, for example, will engage the sprocket teeth 8 on the flanges 4 and 5, while the film 36 will engage the sprocket teeth 8 on the flanges 6 and 7. Under this last-mentioned arrangement, it is possible to have the films 35 and 36 and the projection apparatus arranged in such a manner as to produce a three-dimensional effect. Of course, it is possible to use films 35 or 36 separately and, further, it is possible to place a single 35 mm. film such as film 35 so that the same engages the sprocket teeth 8 of the central flanges 5 and 6, as diagrammatically illustrated by the dotted lines in FIGURE 5 and indicated by reference character 35'.

FIGURE 7 shows three films 46, 47 and 48 of 16 mm. size. Film 46, for example, is provided with sprocket holes 49 located along frame lines 50 separating picture areas 51. Film 46 is also provided with marginal edges 52. Although the size of the film in FIGURE 7 is somewhat different and the picture area has a slightly different aspect ratio, the various portions of the film 46 operate functionally in the same manner as do the corresponding portions of the films shown in FIGURES 5 and 6. Film 47, like film 46, is provided with holes 53, frame lines 54, picture areas 55 and marginal areas 56. Likewise, film 48 is provided with sprocket holes 57, frame lines 58, picture areas 59 and marginal edges 60.

Figure 2:
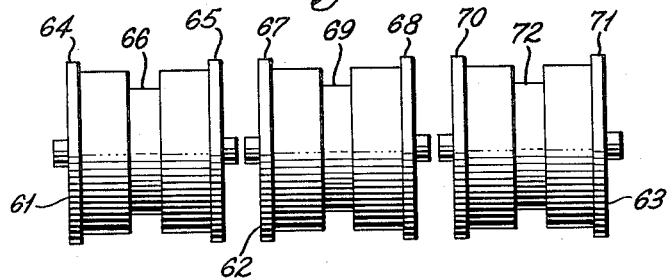
FIGURE 2 is a longitudinal elevation of a set of pad rollers designed for use in combination with the sprocket shown in FIGURE 1.

FIGURE 2 shows a set of rollers 61, 62 and 63 which are to be used in combination with the sprocket of FIGURE 1 when employing the films of FIGURE 7. These rollers may be mounted on individual shafts, as shown, or, if desired, they may be mounted on a single shaft. Roller 61 is provided with peripheral ridges 64 and 65 for the purpose of pressing the edges of a 16 mm. film, for example film 46, against the cylindrical surfaces 15 and 16. Roller 61 is also provided with an annular groove 66 in order to provide clearance for the sprocket teeth 14. In like manner, pad roller 62 is provided with peripheral ridges 67 and 68 and an annular groove 69. Also, pad roller 63 is provided with peripheral ridges 70 and 71 and annular groove 72.

When using the films shown in FIGURE 7, it is possible to employ all three films simultaneously and, with an appropriately adjusted projection system, to use each film to scan a different portion of the surface upon which the picture is to be projected. Naturally, the same considerations hold true for the two films shown in FIGURE 6.

It should be apparent from the foregoing that the sprocket described above will operate using 70 mm., 35 mm. and 16 mm. films in various and different combinations, and for various and different purposes and effects.

Whereas the present invention has been described in particular relation to the drawings included herein, it should be apparent that other and further modifications, apart from those suggested herein, can be made within the spirit and scope of this invention.

What is claimed is:

1. A sprocket for motion picture apparatus comprising a main body portion, a first plurality of longitudinally and equally spaced raised portions of predetermined diameter having thereon a plurality of sprocket teeth, the sprocket teeth on each raised portion being equal in number and in alignment with the sprocket teeth on each other raised portion, a laterally outwardly extending cylindrical surface adjacent each of the endmost raised portions of said first plurality of raised portions, each cylindrical surface having a diameter substantially equal to the root diameter of the sprocket teeth on the adjacent raised portion, a second plurality of laterally and equally spaced raised portions, a respective one of said second plurality of raised portions arranged equidistantly between each adjacent pair of raised portions of said first plurality of raised portions, the raised portions of said second plurality being smaller in diameter than those of said first plurality, each smaller raised portion being provided with sprocket teeth equal in number and in alignment with the sprocket teeth on each other smaller raised portion, the sprocket teeth on each of said raised portions and on each of said smaller raised portions being equal in number and in radial alignment with the sprocket teeth on each other raised and smaller raised portions, the space between each adjacent pair of larger raised portions being provided with a pair of cylindrical surfaces of smaller diameter located adjacent the larger raised portions, the cylindrical surfaces of smaller diameter having a diameter substantially equal to the root diameter of the sprocket teeth on the smaller raised portions whereby one or more film strips of the same or different widths are carried simultaneously on the sprocket in side-by-side relationship.

2. A pad roller in combination with the sprocket set forth in claim 1 including a substantially cylindrical body portion having a pair of peripheral ridges adapted to bear against the cylindrical surfaces of larger diameter, said cylindrical body of said pad roller being provided with annular grooves spaced oppositely from the larger raised portions on said sprocket and providing sufficient clearance for the sprocket teeth on said larger raised portions said pad roller being positioned relative to said sprocket so that film strips of the same width carried in side-by-side relation on the sprocket teeth of the larger raised portions are simultaneously pressed by the pad roller against the sprocket.

3. The improvement as set forth in claim 1 including a substantially cylindrical pad roller adapted to be inserted between each adjacent pair of larger raised portions, said pad roller being provided with peripheral ridges adapted to bear against the cylindrical surfaces of smaller diameter, said pad roller being provided with an annular groove positioned oppositely from said smaller raised portion and being of sufficient size to provide clearance for the sprocket teeth on said smaller raised portion said pad roller being positioned relative to said sprocket so that film strips of the same width carried in side-by-side relation on the sprocket teeth of the smaller raised portions are simultaneously pressed by the pad roller against the sprocket.

4. A sprocket for motion picture apparatus comprising a main body portion adapted to be rotated continuously or intermittently, a first plurality of longitudinally and equally spaced radial flanges mounted on said main body portion and having thereon a plurality of sprocket teeth, the sprocket teeth on each radial flange being equal in number and in alignment with the sprocket teeth on each other radial flange, a laterally outwardly extending cylindrical surface adjacent each of the endmost flanges of said first plurality of radial flanges, each cylindrical surface having a diameter substantially equal to the root diameter of the sprocket teeth on the adjacent flange, a second plurality of laterally and equally spaced flanges of smaller diameter than the flanges of said first plurality, a respective one of said second plurality of flanges mounted on said main body portion and arranged equidistantly between each adjacent pair of larger flanges, each smaller flange being provided with sprocket teeth equal in number and in alignment with the sprocket teeth on each other smaller flange, the sprocket teeth on each of said first plurality of raised flanges and on each of said second plurality of raised flanges being equal in number and in radial alignment with the sprocket teeth on each other of said first and second plurality of raised flanges, the space between each adjacent pair of larger flanges being provided with a pair of cylindrical surfaces of smaller diameter located adjacent the larger flanges, the cylindrical surfaces of smaller diameter having a diameter substantially equal to the root diameter of the sprocket teeth on the smaller flanges whereby film strips of the same or different widths are capable of being carried simultaneously on the sprocket in side-by-side relation.

5. A pad roller in combination with the sprocket set forth in claim 4 including a substantially cylindrical body portion having a pair of peripheral ridges adapted to bear against the cylindrical surfaces of larger diameter, said cylindrical body of said pad roller being provided with annular grooves spaced oppositely from the larger flanges on said sprocket and providing sufficient clearance for the sprocket teeth on said larger flanges, said pad roller being positioned relative to said sprocket so that film strips of the same width carried in side-by-side relation on the sprocket teeth of the larger raised portions are simultaneously pressed by the pad roller against the sprocket.

6. The improvement as set forth in claim 4 including a substantially cylindrical pad roller adapted to be inserted between each adjacent pair of larger flanges, said pad roller being provided with peripheral ridges adapted to bear against the cylindrical surfaces of smaller diameter, said pad roller being provided with an annular groove positioned oppositely from said smaller flange and being of sufficient size to provide clearance for the sprocket teeth on said smaller flange, said pad roller being positioned relative to said sprocket so that film strips of the same width carried in side-by-side relation on the sprocket teeth of the smaller raised portions are simultaneously pressed by the pad roller against the sprocket.

References Cited in the file of this patent

UNITED STATES PATENTS

| | | |
|---|---|---|
| 1,163,557 | Reising | Dec. 7, 1915 |
| 1,891,738 | Thomas | Dec. 20, 1932 |
| 1,989,754 | Kindelmann et al. | Feb. 5, 1935 |
| 2,007,018 | La Porte | June 2, 1935 |
| 2,023,348 | Mihaly | Dec. 3, 1935 |
| 2,073,225 | Ross et al. | Mar. 9, 1937 |
| 2,118,016 | Ross | May 17, 1938 |